(12) United States Patent
Hey et al.

(10) Patent No.: US 8,291,810 B2
(45) Date of Patent: Oct. 23, 2012

(54) HYDRAULIC CYLINDER CONTAMINATION PREVENTION SYSTEM

(75) Inventors: Kenneth E. Hey, Mercer Island, WA (US); William James Setter, Woodinville, WA (US)

(73) Assignee: Sunstream Corporation, Kent, WA (US)

( * ) Notice: Subject to any disclaimer, the term of this patent is extended or adjusted under 35 U.S.C. 154(b) by 886 days.

(21) Appl. No.: 12/356,932

(22) Filed: Jan. 21, 2009

(65) Prior Publication Data

US 2009/0190994 A1    Jul. 30, 2009

Related U.S. Application Data

(60) Provisional application No. 61/021,748, filed on Jan. 17, 2008.

(51) Int. Cl.
*F16J 10/02* (2006.01)
*F15B 15/20* (2006.01)

(52) U.S. Cl. ............................................................ 92/87

(58) Field of Classification Search ...... 92/87; 277/550, 277/636; 403/51
See application file for complete search history.

(56) References Cited

U.S. PATENT DOCUMENTS

| 4,154,434 | A | * | 5/1979 | Wallis ............................... 92/158 |
| 4,195,948 | A | * | 4/1980 | Vancil ................................. 405/3 |
| 4,461,486 | A |   | 7/1984 | Tregonning |
| 4,463,663 | A | * | 8/1984 | Hanson et al. ...................... 92/80 |
| 4,577,363 | A |   | 3/1986 | Wyse |
| 4,819,919 | A | * | 4/1989 | Taylor ............................ 277/636 |
| 5,126,712 | A |   | 6/1992 | Sugiyama |
| 5,402,868 | A |   | 4/1995 | Handke et al. |
| 5,472,072 | A |   | 12/1995 | Bumgarner |
| 5,791,445 | A |   | 8/1998 | Kaufmann et al. |
| 6,047,970 | A |   | 4/2000 | Friend et al. |
| 6,932,356 | B2 |  | 8/2005 | Gloaguen |
| 7,416,064 | B2 |  | 8/2008 | Beck |
| 2006/0012089 | A1 | * | 1/2006 | Beck .......................... 267/64.27 |

FOREIGN PATENT DOCUMENTS

| JP | 59144805 A | * | 8/1984 |
| JP | 59151667 A | * | 8/1984 |
| JP | 2000257606 |   | 9/2000 |
| JP | 2007239895 |   | 9/2007 |

* cited by examiner

*Primary Examiner* — Thomas E Lazo
(74) *Attorney, Agent, or Firm* — Davis Wright Tremaine LLP; George C. Rondeau, Jr.

(57) ABSTRACT

A hydraulic cylinder contamination prevention system for preventing large and small contaminants from entering into a hydraulic cylinder, including a hydraulic cylinder rod cover for underwater use with at least one automatic valve for preventing water circulation between the outside environment and the enclosed environment of the cylinder rod cover when the cylinder is stationary, egress of water from the cylinder rod cover when the cylinder is retracted, and ingress of water into the cylinder rod cover when cylinder is extended, and an external and abrasive cylinder rod scrubber.

24 Claims, 8 Drawing Sheets

HYDRAULIC CYLINDER CONTAMINATION PREVENTION SYSTEM

CROSS REFERENCE TO RELATED APPLICATION

This application claims priority to Provisional Patent Application No. 61/021,748 filed on Jan. 17, 2008.

FIELD OF INVENTION

The invention generally relates to an apparatus and method for preventing contamination from entering a hydraulic cylinder in an underwater environment.

BACKGROUND OF INVENTION

The use of hydraulic cylinders for lifting heavy loads is well known. A common problem in the use of hydraulic cylinders in dirty or underwater environments is contaminants entering into the hydraulic system and causing problems with the hydraulic pumps. Contaminants such as mud, dirt, marine growth, and mineral deposits build up on the cylinder rod and are dragged through the seals of the cylinder barrel. One of the most challenging contaminants are mineral deposits because they are microscopic particles diluted into water. As water flows around the cylinder rod minerals such as calcium carbonate attach to the cylinder rod.

There are many solutions for protecting a hydraulic cylinder shaft in above water applications, but most will not work in an underwater application for various reasons that will be described. The most common cylinder rod protection is a boot that prevents contaminants from contacting the rod of a cylinder. These can be seen in use on motorcycle shock absorbers, heavy machinery and more. The main problem with using a standard boot on an underwater cylinder is the change in volume inside the cylinder boot when the cylinder expands and contracts. Standard cylinder boots allow air to free flow in and out of the boot such as in U.S. Pat. No. 6,932,356 to Gloaguen. If the standard cylinder boot is used underwater the boot will implode while the cylinder extends because the cylinder boot cannot suck in water at same rate it can suck air in. When the cylinder retracts the cylinder boot will balloon because the cylinder boot cannot push water out as fast as it can push air out. A simple solution to allowing water to flow in and out of the cylinder boot would be to add a large vent hole. The cylinder boot with a large vent hole would work to keep large contaminants off of the cylinder rod, but because the hole in the cylinder boot allows water to free flow in and out of the cylinder boot unlimited minerals can float into the cylinder boot and attach to the cylinder rod still leaving a contamination problem.

Another common device used to prevent contamination entering into a hydraulic cylinder is an internal cylinder scrapper. U.S. Pat. No. 4,577,363 to Wyse, U.S. Pat. No. 4,461,486 to Tregonning and U.S. Pat. No. 6,047,970 to Friend are examples of cylinder scrapers. Internal cylinder scrappers are knife edged rings, made from stainless steel or bronze, that are fixed into a cylinder head above the cylinder seals. Internal cylinder scrappers do a good job of removing large marine growth like barnacles, but they allow small particles like mineral deposits or marine growth residue to pass through into the cylinder.

Accordingly, there is a need in the art for a cylinder contamination protection system suitable for underwater use that protects a cylinder from one or both of large contaminants such as mud, dirt and marine growth, and small contaminants such as mineral deposits and marine growth residues.

SUMMARY OF THE INVENTION

The disclosed embodiments of the present invention include a hydraulic cylinder contamination prevention system that prevents one or both of large and small contaminants from entering into the hydraulic cylinder. The hydraulic cylinder contamination prevention system may include a hydraulic cylinder rod cover for underwater use with at least one automatic valve for preventing water circulation between the outside environment and the enclosed environment of the cylinder rod cover when the cylinder is stationary, egress of water from the cylinder rod cover when the cylinder is retracted, and ingress of water into the cylinder rod cover when cylinder is extended. The hydraulic cylinder contamination prevention system may include an external and abrasive cylinder rod scrubber.

The cylinder boot with at least one automatic valve serves two purposes; it protects the cylinder rod from large contaminant build up like mud, barnacles, muscles, and other marine growth and it eliminates the free flow of mineral filled water around the cylinder rod, thus greatly reducing and possibly eliminating the mineral build up on the cylinder rod. The preferred embodiment of the automatic valve of the cylinder rod cover is a rubber flapper valve with a diameter of at least ⅜ inch. The rubber flapper valve seals on itself while the cylinder is stationary. When the cylinder is retracted or extended the force of the water entering in or exhausting from the cylinder rod cover pushes open the flapper valve. The open flapper valve allows water to flow in and out of the cylinder rod cover without causing implosion or ballooning of the cylinder rod cover when the cylinder is extending or retracting. The automatic valve may also be a slit in the flexible material of the hydraulic cylinder rod cover such as a slit in a rubber cylinder boot.

The preferred embodiment of the cylinder rod cover is a corrugated shape similar to a bellows. The number and size of the corrugations is selected to allow marine growth on the cylinder rod cover while not inhibiting the expansion and contraction of the corrugated cylinder rod cover. The cylinder rod cover is preferably be made of a durable material such as EPDM rubber so the marine growth does not cause tearing. The durometer of the material is also to be considered since too soft durometer material will allow ballooning of the cylinder rod cover and too hard a durometer material will cause the cylinder rod cover to buckle. Through testing a preferred durometer is around Shore 80A.

If some small contaminants are able to attach to the cylinder rod the external and abrasive cylinder rod scrubber removes the remaining contaminants from the cylinder rod. The preferred embodiment of the cylinder rod scrubber is cut out of an abrasive scotch-brite type pad and then wrapped around the cylinder rod and clamped to the cylinder barrel. The cylinder rod slides through the abrasive cylinder rod scrubber removing any small contaminant build up.

Preferably, the cylinder rod cover and cylinder rod scrubber will be used together, but in some cases the cylinder rod cover and cylinder rod scrubber can be used separate of each other and perform their singular functions. An example of this would be a location with high marine growth, but low mineral content in the water (such as in salt water); in this case someone may choose to use just the cylinder rod cover. Another example would be a low marine growth low mineral content water location (such as in a fresh water lake); in this case someone may choose to use just the cylinder rod scrubber to keep the cylinder rod clean.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, which are schematic, and not to scale, wherein.

DETAILED DESCRIPTION OF THE PREFERRED EMBODIMENT

The following descriptions illustrate aspects of the invention, and identify certain preferred embodiments of these aspects. The descriptions are not intended to be exhaustive, but rather to inform and teach a person of skill in the art who will come to appreciate more fully other aspects, equivalents, and possibilities presented, and hence the scope of the invention is set forth in the claims, which alone limit its scope.

Several details of the preferred embodiments are set forth in the following description: FIGS. 1 through 12 provide a thorough understanding of such embodiments. One skilled in the art will understand that the present invention may be practiced without several of the details described herein. In the following description of the embodiments, it is understood that the figures related to the various embodiments are not to be interpreted as conveying any specific or relative physical dimension, and that specific or relative dimensions related to the various embodiments, if stated, are not be considered limiting unless the claims state otherwise.

Figures 1, 2:
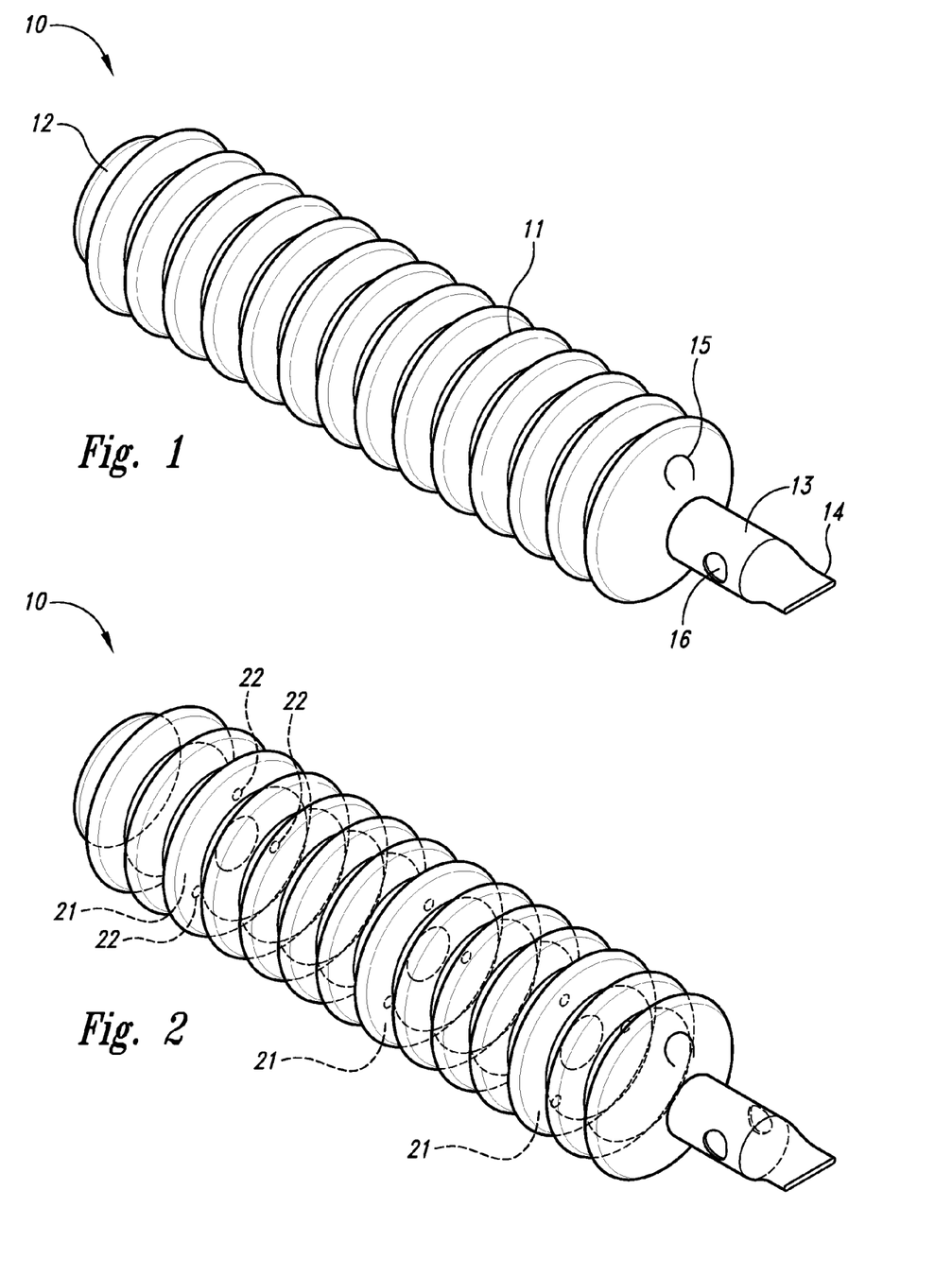
FIG. 1 is an isometric view of a cylinder boot.
FIG. 2 is a transparent isometric view of the cylinder boot.
Figure 4:
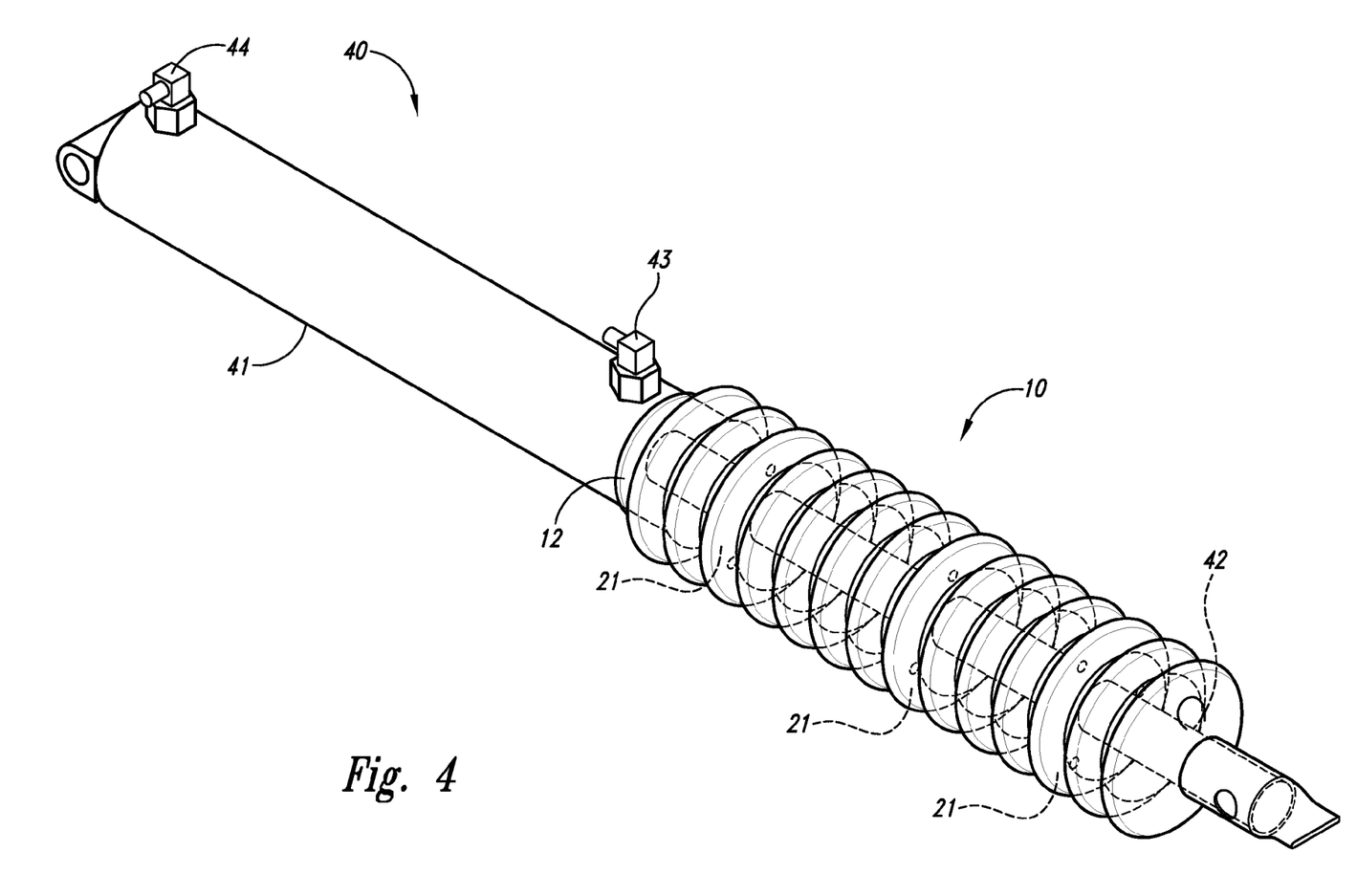
FIG. 4 is an isometric view of the cylinder boot mounted to a cylinder.

FIG. 1 shows an isometric view of a preferred embodiment of a cylinder boot 10 comprising of a flexible corrugated cylinder 11. The cylinder boot 10 uses a cylinder barrel attachment 12 which may be a clamp or zip tie to hold it fast to a cylinder barrel 41 of a hydraulic cylinder 40 such as shown in FIG. 4. The cylinder boot 10 also includes cylinder rod attachment 13 which is an end portion of the cylinder boot which fits more tightly around a cylinder shaft or rod 42 such as shown in FIG. 4 to hold the end portion fast to the cylinder rod so that the end portion of the cylinder boot attached to the cylinder rod moves with the cylinder rod as it extends from and retracts into the cylinder barrel 41. In the illustrated embodiment, the cylinder rod attachment 13 includes a pin hole 16 that is sized and located to coincide with a pin hole in the cylinder rod to allow insertion of a pin (not shown) through the pin hole 16 and the pin hole of the cylinder rod and thereby attach the end of the cylinder rod 42 to the mechanism it moves. When the pin is inserted into the pin hole 16 and the pin hole in the cylinder rod, the end portion of the cylinder boot 10 is securely affixed to the cylinder rod 42 and held in place during operation of the hydraulic cylinder 40.

The cylinder boot 10 also includes a duck bill vent 14 and flapper vent 15. Duck bill vent 14 and flapper vent 15 of cylinder boot 10 allow water to flow in and out of cylinder boot 10 when it travels between extended position "A" (shown in FIG. 5) and collapsed position "B" (shown in FIG. 6). When cylinder boot 10 is stationary, duck bill vent 14 and flapper vent 15 keep water from free flowing through cylinder boot 10. The cylinder boot 10 may be made of a rubber material. Alternative venting may include a slit in the flexible material of the cylinder boot 10. Although a slit would allow some leakage since not a perfect seal, it would serve the same purpose and accomplishes the desired function. In the preferred embodiments passive acting valves are used so their action is automatic and require no external control or power to operate, and simply respond to the water pressure applied thereto during operation of the cylinder boot 10 and the water flow.

FIG. 2 is a transparent isometric view of the cylinder boot 10 further comprising interiorly positioned collapsing guides 21. Collapsing guides 21 have holes 22 to allow water to flow through.

Figure 3:
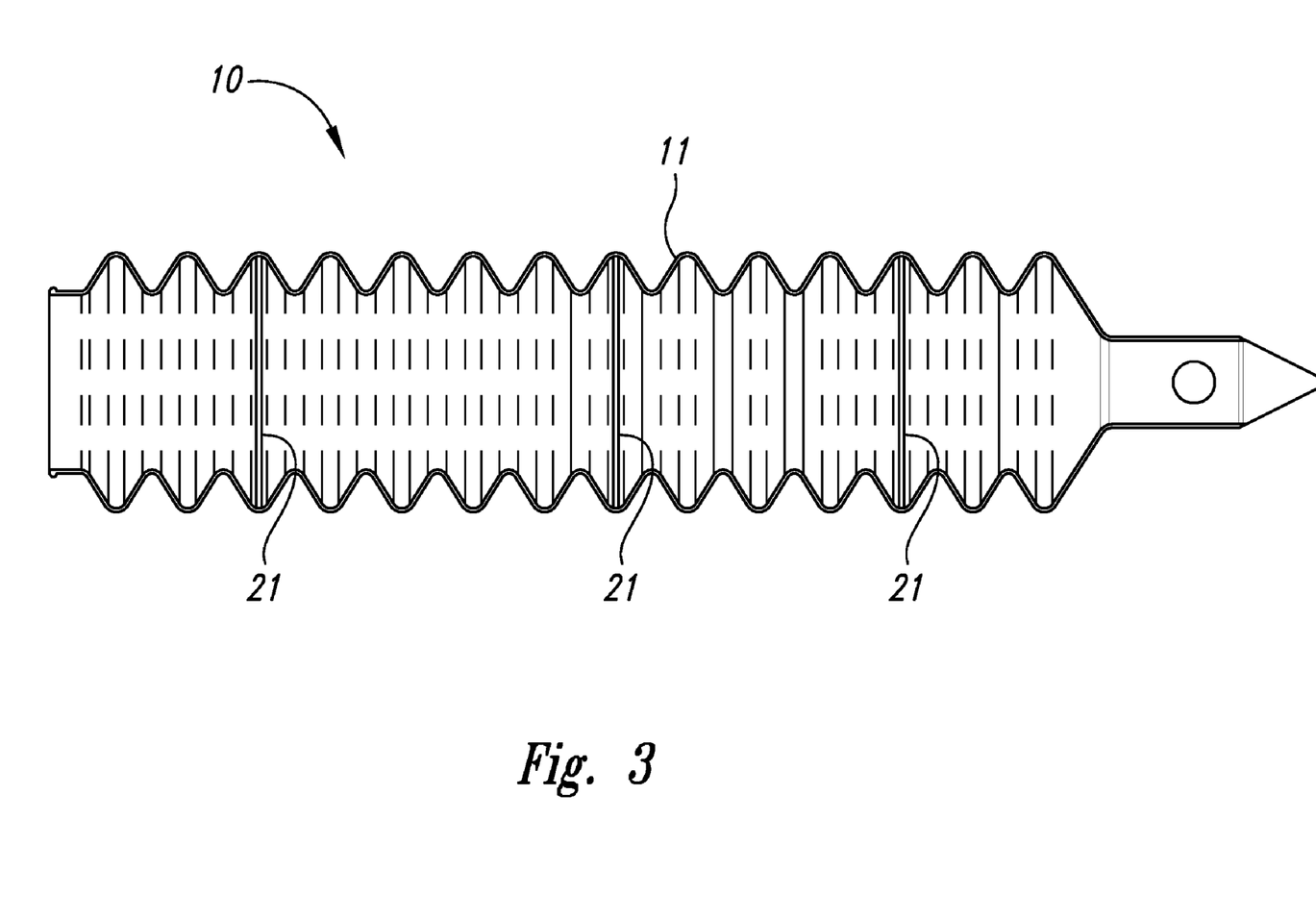
FIG. 3 is a side view of the cylinder boot.

FIG. 3 is a side cross-sectional view of cylinder boot 10 showing collapsing guides 21 nesting in the corrugated flaps of flexible corrugated cylinder 11.

FIG. 4 is an isometric view of cylinder 40 illustrating its cylinder barrel 41 and cylinder rod 42, shown with cylinder boot 10 protecting cylinder rod 42. As discussed above, cylinder boot 10 attaches to cylinder 40 at cylinder barrel 41 with cylinder barrel attachment 12 and at cylinder rod 42 with cylinder rod attachment 13. Collapsing guides 21 of cylinder boot 10 slide over cylinder rod 42 to allow cylinder boot 10 to collapse evenly when cylinder 40 is drawn into the collapsed position "B" (see FIG. 6). The cylinder barrel 41 of cylinder 40 includes two hydraulic fluid ports 43 and 44 to control fluid powered operation of the cylinder. In the embodiment of FIG. 4, the cylinder barrel attachment 12 is located longitudinally outward of the fluid port 43 at the end of the cylinder barrel 41 from which the cylinder rod 42 extends.

Figure 5:
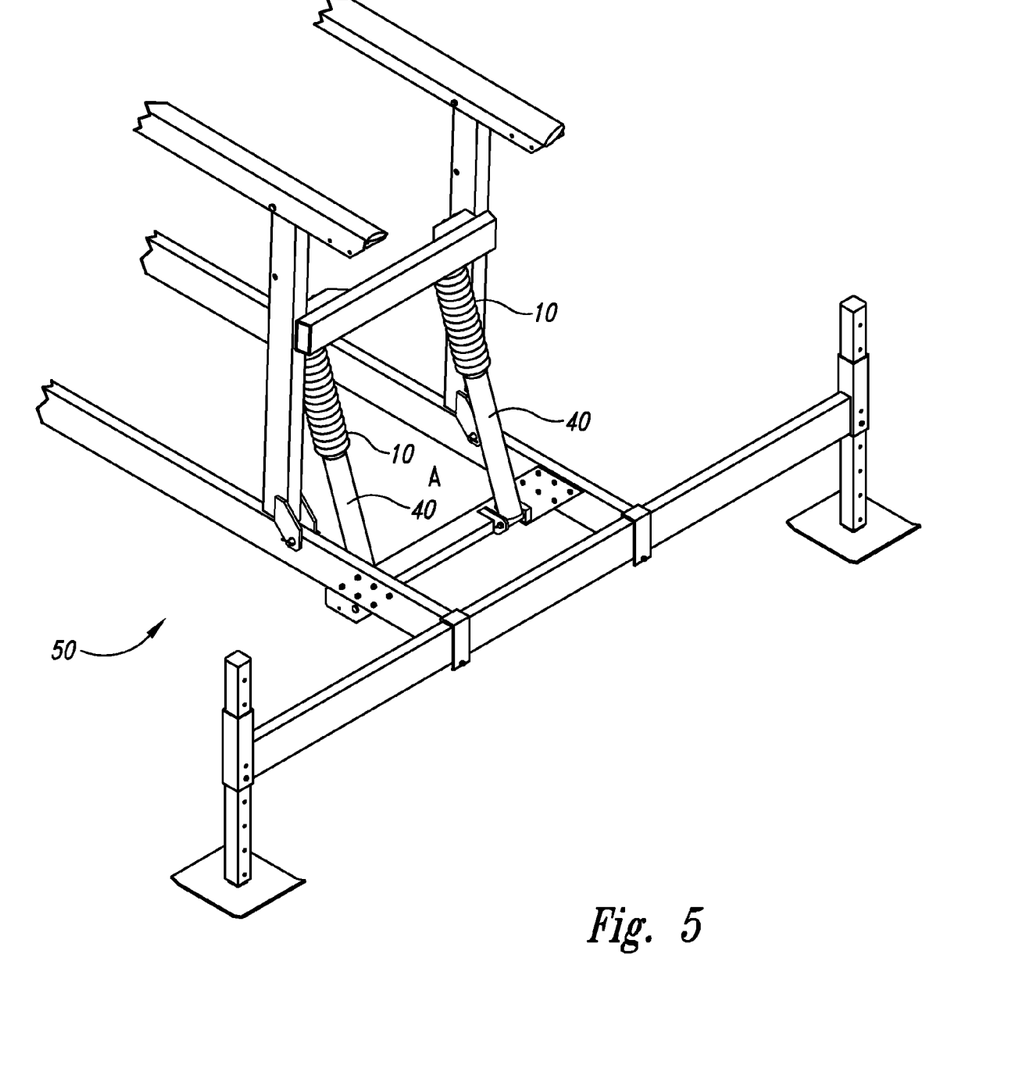
FIG. 5 is an isometric view of a boat lift with an extend cylinder with a boot attached thereto.

FIG. 5 is a partial isometric view of a boatlift 50 with cylinder 40 in the extended position "A" with the cylinder rod 42 extended, with the cylinder boot 10 protecting cylinder rod 42 from the marine environment.

Figure 6:
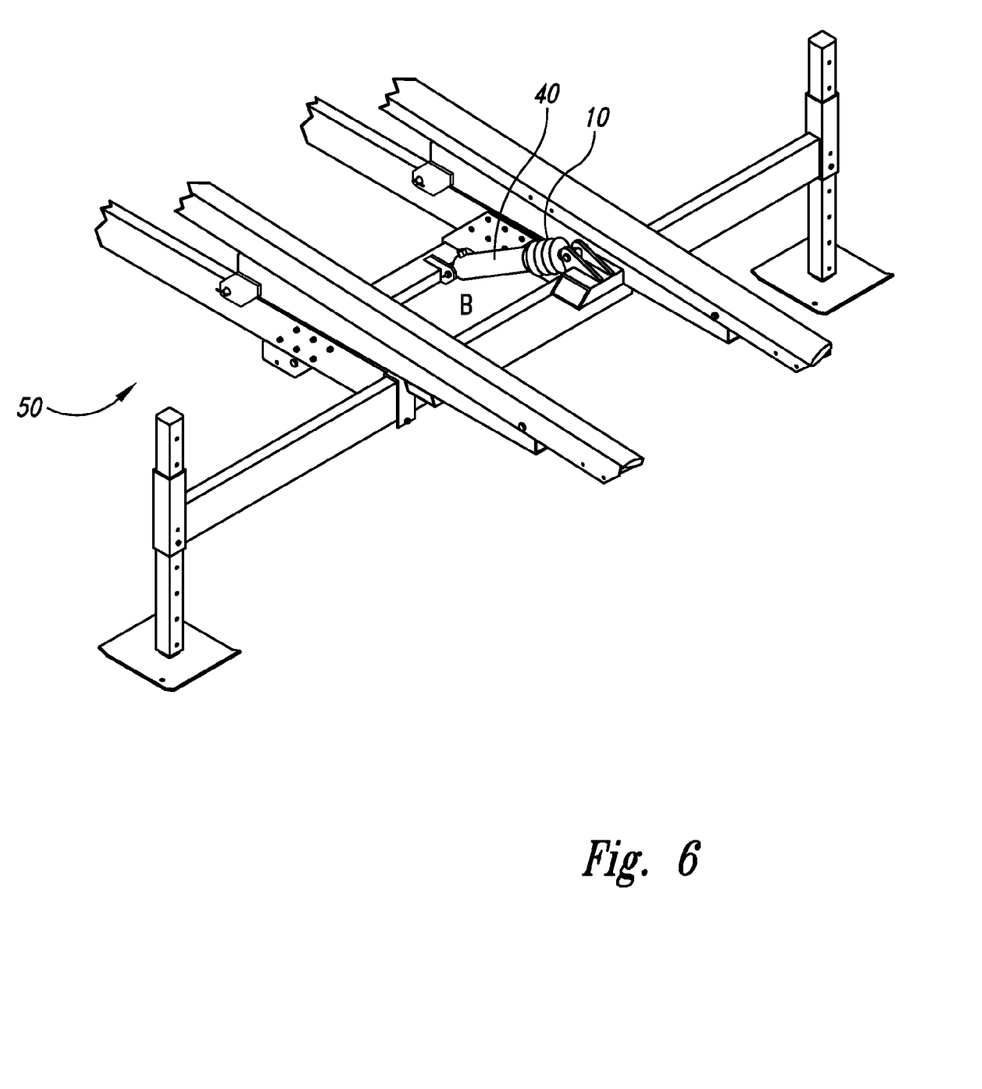
FIG. 6 is an isometric view of the boat lift of FIG. 5 with the cylinder retracted.

FIG. 6 is a partial isometric view of boatlift 50 with cylinder 40 in the collapsed position "B" with the cylinder rod 42 retracted, again with the cylinder boot 10 protecting cylinder rod 42 from the marine environment.

Figure 7:
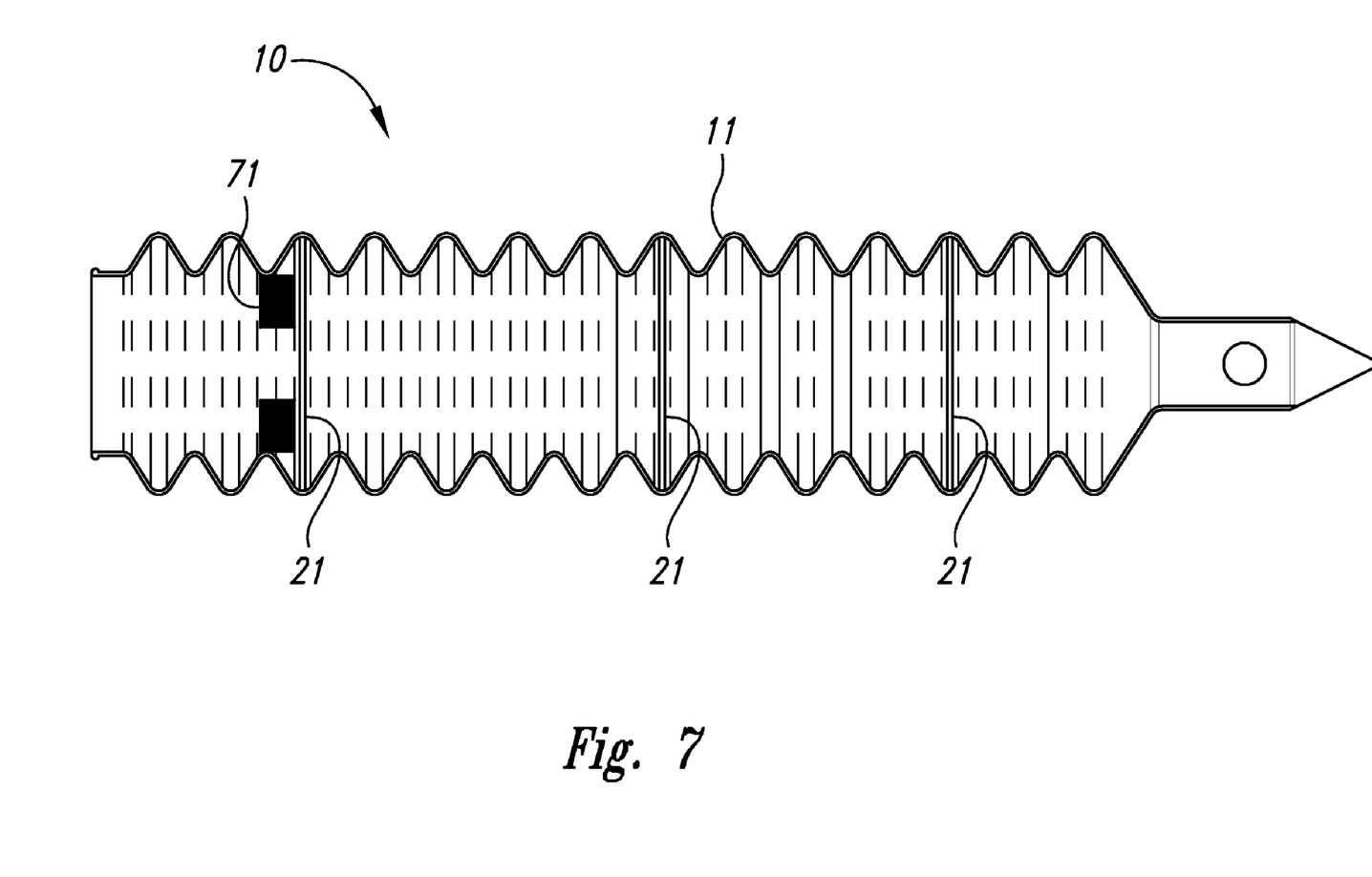
FIG. 7 is a side view of the cylinder boot with an abrasive ring.

FIG. 7 is a side cross-sectional view of cylinder boot 10 showing collapsing guides 21 nesting in the corrugated flaps of flexible corrugated cylinder 11. The rear collapsing guide 21 has abrasive ring 71 attached which serves as a cylinder rod scrubber. Abrasive ring 71 fits tightly to cylinder rod 42 shown in FIG. 4, to clean off any contamination attached to the cylinder rod 42.

Figure 8:
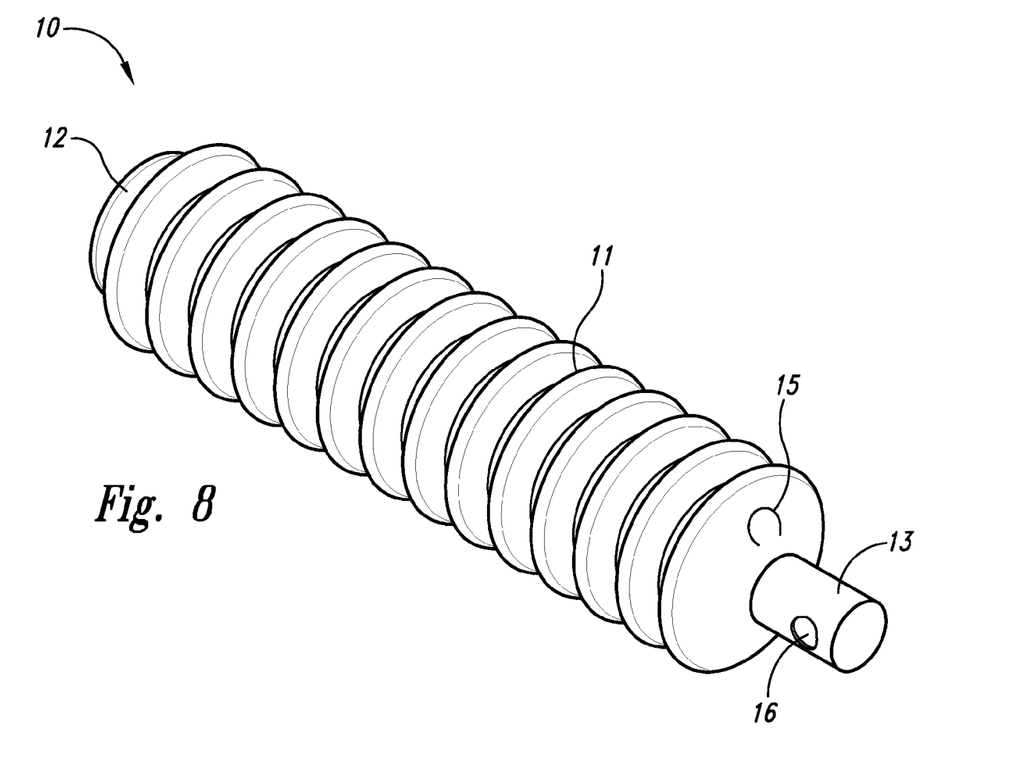
FIG. 8 is an isometric view of a second embodiment of the cylinder boot.

FIG. 8 shows an isometric view of a second preferred embodiment of the cylinder boot 10 comprising of a flexible corrugated cylinder 11, cylinder barrel attachment 12, cylinder rod attachment 13, pin hole 16, and flapper vent 15. Flapper vent 15 of cylinder boot 10 allows water to flow in and out of cylinder boot 10 when it travels between extended position "A" (shown in FIG. 5) and collapsed position "B" (shown in FIG. 6). When cylinder boot 10 of FIG. 8 is stationary, duck bill vent 14 and flapper vent 15 keep water from free flowing through cylinder boot 10.

Figure 9:
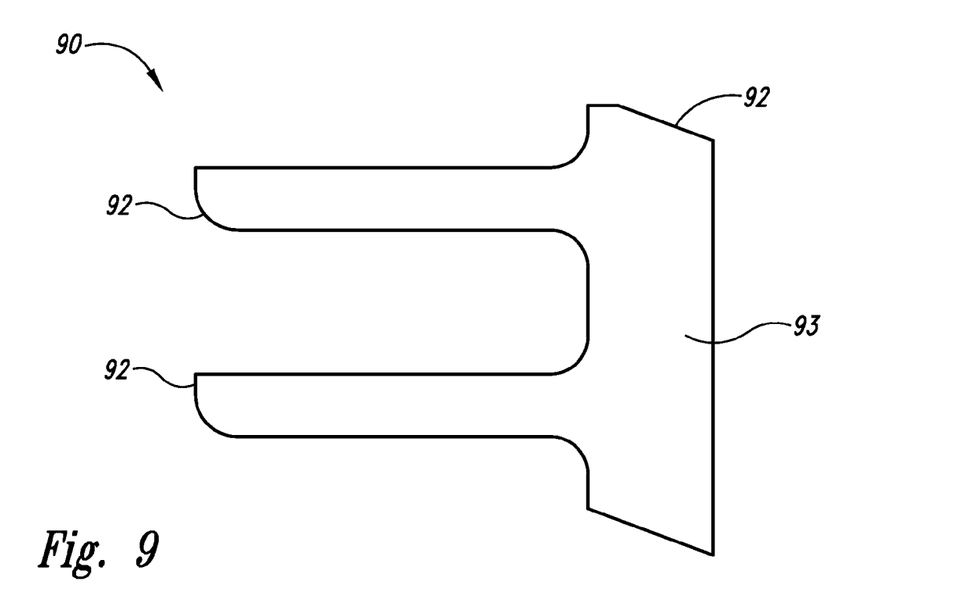
FIG. 9 is a second embodiment of the abrasive ring.
Figure 10:
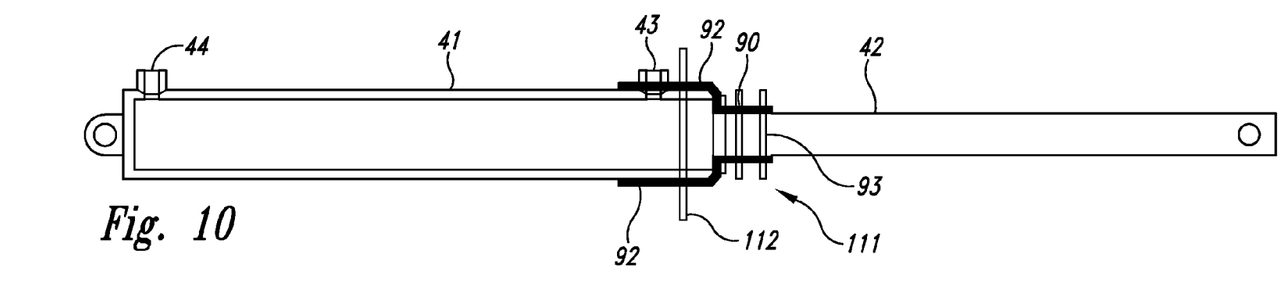
FIG. 10 is a side view of a cylinder with the abrasive ring of FIG. 9 shown attached to the cylinder.

FIG. 9 is a second embodiment showing an alternative abrasive ring 90. The abrasive ring 90 is preferably manufactured from a flat stock material by cutting out the design illustrated in FIG. 9 with a scrubbing head portion including a pair of opposite diagonal cuts 91 which mate together in opposing positions when wrapped around the cylinder rod 42 when installed on the cylinder rod, and a scrubbing surface 93 that engages the cylinder rod as it extends and retracts to clean the cylinder rod. The cylinder rod 42 slides through the abrasive ring 90 which scrubs and thereby removes any small contaminant build up. The abrasive ring 90 includes a pair of attachment legs 92 that when the installed abrasive ring is wrapped around the cylinder rod 42 are positioned on opposite sides of the cylinder barrel 41 as shown in FIG. 10. The legs 92 are spaced apart sufficiently to be positioned with the fluid port 43 projecting therebetween. The preferred embodiment of the abrasive ring 90 is cut out of an abrasive scotchbrite type pad and then wrapped around cylinder barrel 41 and cylinder rod 42, and clamped to thereto as will be described below.

FIG. 10 is a side view of cylinder 40 with abrasive ring 90 of FIG. 9 clamped to cylinder rod 42 with scrubbing surface 93 thereof extending around the cylinder rod and clamped thereto by zip ties 111 thereby holding the scrubbing surface in tight engagement with the cylinder rod. The legs 92 of the abrasive ring 90 are shown clamped to cylinder barrel 41 with a zip tie 112. With this arrangement, the cylinder rod 42 can slide through scrubbing surface 93 to clean off mineral deposits such as calcium carbonate.

Figure 11:
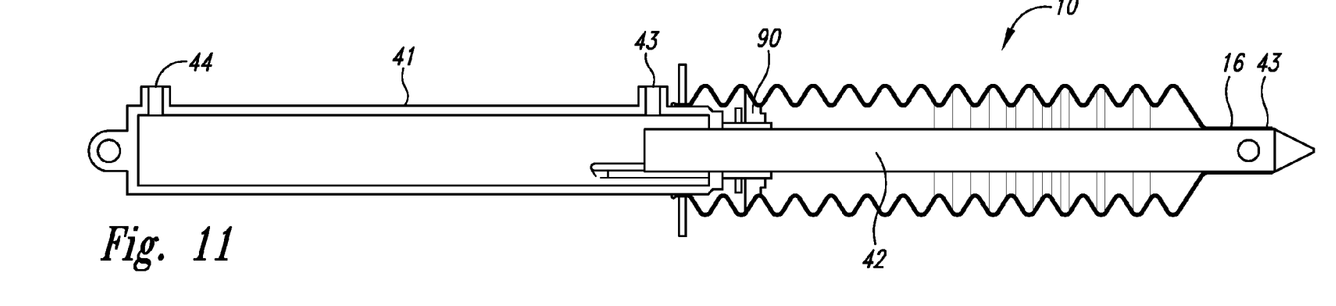
FIG. 11 is a cross-sectional side view of the cylinder of FIG. 10 with a cylinder boot and abrasive ring attached.

FIG. 11 is a side cross-sectional view of cylinder 40 of FIG. 9 with cylinder boot 10 and abrasive ring 90 attached.

Figure 12:
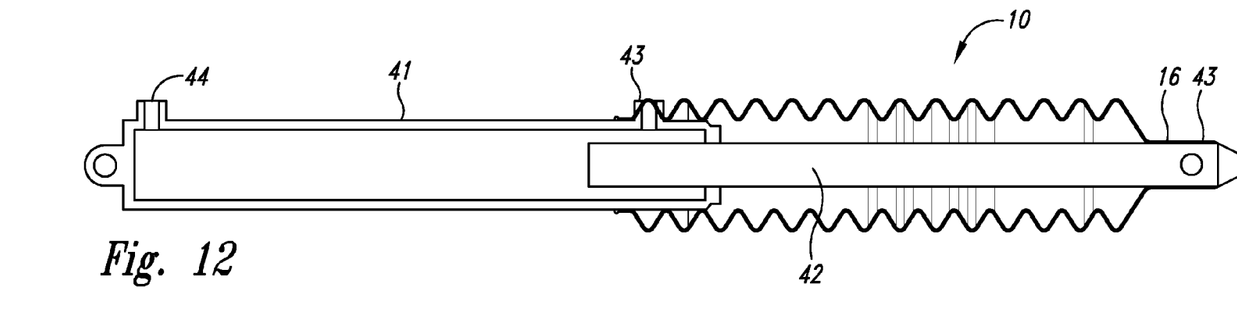
FIG. 12 is a cross-sectional side view of an alternative cylinder boot extending over a hydraulic fluid port of a cylinder.

FIG. 12 is a side cross-sectional view of cylinder 40 of FIG. 9 using an alternative cylinder boot 10 with an end portion that extends over the fluid port 43 of the cylinder barrel 41 which has a hole or cutout sized and positioned to permit the fluid port 43 to extend therethrough. In this embodiment the fluid port 43 retains the cylinder boot 10 attached to the cylinder barrel 41 with or without the use of the zip time 112.

What is claimed is:

1. A submersible hydraulic cylinder contamination prevention system for use with a hydraulic cylinder having a cylinder barrel and a cylinder shaft, comprising an external and abrasive cylinder rod scrubber having a first attachment portion configured to be clamped to the cylinder barrel and a second scrubbing portion sized and configured to extend around and engage the cylinder shaft, wherein the first portion of the cylinder rod scrubber has a plurality of spaced apart legs configured to be spaced apart around the cylinder barrel.

2. A submersible hydraulic cylinder contamination prevention system for use with a hydraulic cylinder having a cylinder barrel and a cylinder shaft, comprising an external and abrasive cylinder rod scrubber having a first attachment portion configured to be clamped to the cylinder barrel and a second scrubbing portion sized and configured to extend around and engage the cylinder shaft, the second portion having opposing first and second diagonally angled ends which when the second portion is extending around the cylinder shaft mate with each other.

3. A submersible hydraulic cylinder contamination prevention system for use with a hydraulic cylinder having a cylinder barrel and a cylinder shaft, comprising an external and abrasive cylinder rod scrubber having a first attachment portion configured to be clamped to the cylinder barrel and a second scrubbing portion sized and configured to extend around and engage the cylinder shaft, wherein the cylinder rod scrubber is made of a non-metallic material.

4. A submersible hydraulic cylinder contamination prevention system for use with a hydraulic cylinder having a cylinder barrel and a cylinder shaft, comprising an external and abrasive cylinder rod scrubber having a first attachment portion configured to be clamped to the cylinder barrel and a second scrubbing portion sized and configured to extend around and engage the cylinder shaft, wherein the cylinder rod scrubber is manufactured from a flat material and sufficiently flexible to be wrapped around the cylinder shaft.

5. A submersible hydraulic cylinder contamination prevention system for use with a hydraulic cylinder having a cylinder barrel and a cylinder shaft, where the cylinder shaft has a hole sized to receive a pin, comprising:
a submersible hydraulic cylinder rod cover defining an interior space sized to at least partially receive the hydraulic cylinder therein and having at least one automatic valve configured to prevent water circulation between the outside environment and the space within the cylinder rod cover when the cylinder is stationary, and to allow egress of water from the space within the cylinder rod cover when the cylinder is retracted, and ingress of water into the space within the cylinder rod cover when the cylinder rod is extended, wherein the hydraulic cylinder rod cover has a hole to allow the pin to pass therethrough and into the cylinder shaft hole.

6. The submersible hydraulic cylinder contamination prevention system of claim 5 wherein the hydraulic cylinder rod cover has a bellows shape.

7. The submersible hydraulic cylinder contamination prevention system of claim 5 wherein the hydraulic cylinder rod cover is made of a rubber material.

8. A submersible hydraulic cylinder contamination prevention system for use with a hydraulic cylinder having a cylinder barrel and a cylinder shaft, where the cylinder barrel has a fluid port at an end thereof toward the cylinder shaft, comprising:
a submersible hydraulic cylinder rod cover defining an interior space sized to at least partially receive the hydraulic cylinder therein and having at least one automatic valve configured to prevent water circulation between the outside environment and the space within the cylinder rod cover when the cylinder is stationary, and to allow egress of water from the space within the cylinder rod cover when the cylinder is retracted, and ingress of water into the space within the cylinder rod cover when the cylinder rod is extended, wherein the cylinder rod cover has an end portion sized and shaped to extend over the end portion of the cylinder barrel with an opening sized and positioned therein to allow the fluid port to extend therethrough.

9. A submersible hydraulic cylinder contamination prevention system for use with a hydraulic cylinder having a cylinder barrel and a cylinder shaft, comprising:
a submersible hydraulic cylinder rod cover defining an interior space sized to at least partially receive the hydraulic cylinder therein and having at least one automatic valve configured to prevent water circulation between the outside environment and the space within the cylinder rod cover when the cylinder is stationary, and to allow egress of water from the space within the cylinder rod cover when the cylinder is retracted, and ingress of water into the space within the cylinder rod cover when the cylinder rod is extended, and further including an external and abrasive cylinder rod scrubber having a first attachment portion configured to be attached to the cylinder barrel and a second scrubbing portion sized and configured to extend around and engage the cylinder shaft.

10. The submersible hydraulic cylinder contamination prevention system of claim 9 wherein the first portion of the cylinder rod scrubber has a plurality of spaced apart legs configured to be spaced apart around the cylinder barrel.

11. The submersible hydraulic cylinder contamination prevention system of claim 9 wherein the second portion has opposing first and second diagonally angled ends which when the second portion is extending around the cylinder shaft mate with each other.

12. A submersible hydraulic cylinder contamination prevention system for use with a hydraulic cylinder having a cylinder barrel and a cylinder shaft, comprising:
a hydraulic cylinder rod cover for underwater use defining an interior space sized to at least partially receive the hydraulic cylinder therein; and
an external and abrasive cylinder rod scrubber configured to attach to the cylinder barrel and extend around and engage the cylinder shaft, wherein the hydraulic cylinder rod cover has at least one automatic valve configured to prevent water circulation between the outside environment and the enclosed environment within the cylinder rod cover when the cylinder is stationary, and to allow egress of water from the cylinder rod cover when the cylinder rod is retracted, and ingress of water into the cylinder rod cover when the cylinder rod is extended.

13. The hydraulic cylinder contamination prevention system of claim 12 wherein said cylinder rod cover is made from a rubber material.

14. A submersible hydraulic cylinder contamination prevention system for use with a hydraulic cylinder having a cylinder barrel and a cylinder shaft, comprising:
a hydraulic cylinder rod cover for underwater use defining an interior space sized to at least partially receive the hydraulic cylinder therein; and
an external and abrasive cylinder rod scrubber configured to attach to the cylinder barrel and extend around and engage the cylinder shaft, wherein the abrasive cylinder rod scrubber is made from a non-metallic material.

15. A submersible hydraulic cylinder contamination prevention system, comprising;
a hydraulic cylinder having a cylinder barrel and a cylinder shaft;
an external and abrasive cylinder rod scrubber having a first attachment portion attached to the cylinder barrel and a second scrubbing portion extending around and engaging the cylinder shaft, the first portion of the cylinder rod scrubber having a plurality of legs positioned at spaced apart locations around the cylinder barrel; and
a clamp clamping the plurality of legs to the cylinder barrel.

16. A submersible hydraulic cylinder contamination prevention system, comprising;
a hydraulic cylinder having a cylinder barrel and a cylinder shaft; and
an external and abrasive cylinder rod scrubber having a first attachment portion attached to the cylinder barrel and a second scrubbing portion extending around and engaging the cylinder shaft, the second portion having opposing first and second diagonally angled ends which mate with each other.

17. A submersible hydraulic cylinder contamination prevention system, comprising;
a hydraulic cylinder having a cylinder barrel and a cylinder shaft; and
an external and abrasive cylinder rod scrubber having a first attachment portion attached to the cylinder barrel and a second scrubbing portion extending around and engaging the cylinder shaft, wherein the cylinder rod scrubber is made of a flat, non-metallic, flexible material and is wrapped around the cylinder shaft.

18. A submersible hydraulic cylinder contamination prevention system, comprising:
a hydraulic cylinder having a cylinder barrel and a cylinder shaft, the cylinder shaft having a hole with a pin received therein; and
a submersible hydraulic cylinder rod cover defining an interior space at least partially receiving the hydraulic cylinder therein and having at least one automatic valve configured to prevent water circulation between the outside environment and the space within the cylinder rod cover when the cylinder is stationary, and to allow egress of water from the space within the cylinder rod cover when the cylinder is retracted, and ingress of water into the space within the cylinder rod cover when the cylinder rod is extended, the hydraulic cylinder rod cover having a hole through which the pin to extends.

19. The submersible hydraulic cylinder contamination prevention system of claim 18 wherein the hydraulic cylinder rod cover has a first end portion attached to the cylinder barrel and a second end portion attached to the cylinder rod for movement therewith.

20. A submersible hydraulic cylinder contamination prevention system, comprising:
a hydraulic cylinder having a cylinder barrel and a cylinder shaft; and
a submersible hydraulic cylinder rod cover defining an interior space at least partially receiving the hydraulic cylinder therein and having at least one automatic valve configured to prevent water circulation between the outside environment and the space within the cylinder rod cover when the cylinder is stationary, and to allow egress of water from the space within the cylinder rod cover when the cylinder is retracted, and ingress of water into the space within the cylinder rod cover when the cylinder rod is extended, wherein the hydraulic cylinder rod cover has a bellows shape.

21. A submersible hydraulic cylinder contamination prevention system, comprising:
a hydraulic cylinder having a cylinder barrel and a cylinder shaft; and
a submersible hydraulic cylinder rod cover defining an interior space at least partially receiving the hydraulic cylinder therein and having at least one automatic valve configured to prevent water circulation between the outside environment and the space within the cylinder rod cover when the cylinder is stationary, and to allow egress of water from the space within the cylinder rod cover when the cylinder is retracted, and ingress of water into the space within the cylinder rod cover when the cylinder rod is extended, wherein the cylinder barrel has a fluid port at an end thereof toward the cylinder shaft, and the hydraulic cylinder rod cover has an end portion extending over the end portion of the cylinder barrel, the end portion of the hydraulic rod cover having an opening into which the fluid port extends.

22. A submersible hydraulic cylinder contamination prevention system, comprising:

a hydraulic cylinder having a cylinder barrel and a cylinder shaft;

a submersible hydraulic cylinder rod cover defining an interior space at least partially receiving the hydraulic cylinder therein and having at least one automatic valve configured to prevent water circulation between the outside environment and the space within the cylinder rod cover when the cylinder is stationary, and to allow egress of water from the space within the cylinder rod cover when the cylinder is retracted, and ingress of water into the space within the cylinder rod cover when the cylinder rod is extended; and an external and abrasive cylinder rod scrubber having a first attachment portion attached to the cylinder barrel and a second scrubbing portion extending around and engaging the cylinder shaft.

23. The submersible hydraulic cylinder contamination prevention system of claim 22 wherein the first portion of the cylinder rod scrubber has a plurality of spaced apart legs positioned at spaced apart locations around the cylinder barrel.

24. The submersible hydraulic cylinder contamination prevention system of claim 22 wherein the second portion of the cylinder rod scrubber has opposing first and second diagonally angled ends which mate with each other.

* * * * *